(12) United States Patent
Hui et al.

(10) Patent No.: US 10,360,073 B2
(45) Date of Patent: Jul. 23, 2019

(54) SYSTEM AND METHOD FOR MOBILE AUGMENTED REALITY TASK SCHEDULING

(71) Applicant: DEUTSCHE TELEKOM AG, Bonn (DE)

(72) Inventors: Pan Hui, Hong Kong (CN); Junqiu Wei, Hong Kong (CN); Christoph Peylo, Damme (DE)

(73) Assignee: DEUTSCHE TELEKOM AG, Bonn (DE)

( * ) Notice: Subject to any disclaimer, the term of this patent is extended or adjusted under 35 U.S.C. 154(b) by 24 days.

(21) Appl. No.: 15/106,834

(22) PCT Filed: Dec. 16, 2014

(86) PCT No.: PCT/EP2014/078006
§ 371 (c)(1),
(2) Date: Jun. 21, 2016

(87) PCT Pub. No.: WO2015/097022
PCT Pub. Date: Jul. 2, 2015

(65) Prior Publication Data
US 2017/0004019 A1   Jan. 5, 2017

(30) Foreign Application Priority Data

Dec. 23, 2013   (EP) .................................... 13199458

(51) Int. Cl.
*G06F 9/50* (2006.01)
*G06T 1/20* (2006.01)
(Continued)

(52) U.S. Cl.
CPC .......... *G06F 9/5083* (2013.01); *G06F 9/4881* (2013.01); *G06F 9/5072* (2013.01); *G06T 1/20* (2013.01)

(58) Field of Classification Search
None
See application file for complete search history.

(56) References Cited

U.S. PATENT DOCUMENTS

2008/0163183 A1*  7/2008  Li ................................ 717/149
2011/0035737 A1   2/2011  Stefansson et al.
(Continued)

FOREIGN PATENT DOCUMENTS

EP   2651101 A1   10/2013

OTHER PUBLICATIONS

Eduardo Cuervo: "Enhancing Mobile Devices through Code Offload", May 1, 2012 (May 1, 2012), XP055314489, retrieved from internet: ULR:dukespace.lib.duke.edu/dspace/bitstream/handle/10161/5768/Cuervo_duke_0066D_11496.pdf?sequence=1.

*Primary Examiner* — Eric C Wai
(74) *Attorney, Agent, or Firm* — Leydig, Voit & Mayer, Ltd.

(57) ABSTRACT

A system for scheduling mobile augmented reality tasks performed on at least one mobile device and a workspace includes: a mobile device, comprising a central processing unit (CPU) and a graphics processing unit (GPU); a Network Profiling Component, configured to gather network related context data; a Device Profiling Component, configured to gather hardware related context data; an Application Profiling Component, configured to gather application related context data; and a Scheduling Component, configured to receive the network related context data, the hardware related context data, and the application related context data, and to schedule tasks between the CPU, the GPU and the workspace.

19 Claims, 5 Drawing Sheets

(51) Int. Cl.
   *G06F 9/48*  (2006.01)
   *G06F 9/46*  (2006.01)

(56) References Cited

U.S. PATENT DOCUMENTS

| | | |
|---|---|---|
| 2011/0088020 A1 | 4/2011 | Eichenberger et al. |
| 2012/0149464 A1 | 6/2012 | Bone et al. |
| 2015/0143347 A1* | 5/2015 | Jones ........................ G06F 8/41 717/140 |

* cited by examiner

SYSTEM AND METHOD FOR MOBILE AUGMENTED REALITY TASK SCHEDULING

CROSS-REFERENCE TO RELATED APPLICATIONS

This application is a U.S. National Phase application under 35 U.S.C. § 371 of International Application No. PCT/EP2014/078006, filed on Dec. 16, 2014, and claims benefit to European Patent Application No. EP 13199458.4, filed on Dec. 23, 2013. The International Application was published in English on Jul. 2, 2015 as WO 2015/097022 A1 under PCT Article 21(2).

FIELD

The present invention generally relates to a task scheduling system and method, more particular to a task scheduling system and method for Mobile Augmented Reality (MAR).

BACKGROUND

MAR is a term for a live direct or indirect view of a physical real world mobile environment, whose elements are augmented by sensory input, such as sounds or graphics. Although it is just a very young technology, academia and industry community both foresee a rapid growth of it in this field.

As mobile devices are becoming increasingly sophisticated with a GPU, GPS and a set of sensors, some ubiquitous services such as indoor navigation, real-time image search become possible.

Therefore, real-time is a key property of MAR, especially for interaction. However, rendering and image processing such as SURF (SURF=speed up robust features) feature detection as well as tracking and registration are very time-consuming while mobile devices are armed with limited resources in comparison to personal computer and server. Poor application performance and terrible user experience are resulted if the problem is handled in traditional way.

Recently, scholars developed some methods to improve MAR through reasonable scheduling but they are still not mature enough to take advantage of resources and do not improve the performance significantly.

SUMMARY

In an embodiment, the present invention provides a system for scheduling mobile augmented reality tasks performed on at least one mobile device and a workspace. The system includes: a mobile device, comprising a central processing unit (CPU) and a graphics processing unit (GPU); a Network Profiling Component, configured to gather network related context data; a Device Profiling Component, configured to gather hardware related context data; an Application Profiling Component, configured to gather application related context data; and a Scheduling Component, configured to receive the network related context data, the hardware related context data, and the application related context data, and to schedule tasks between the CPU, the GPU and the workspace.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
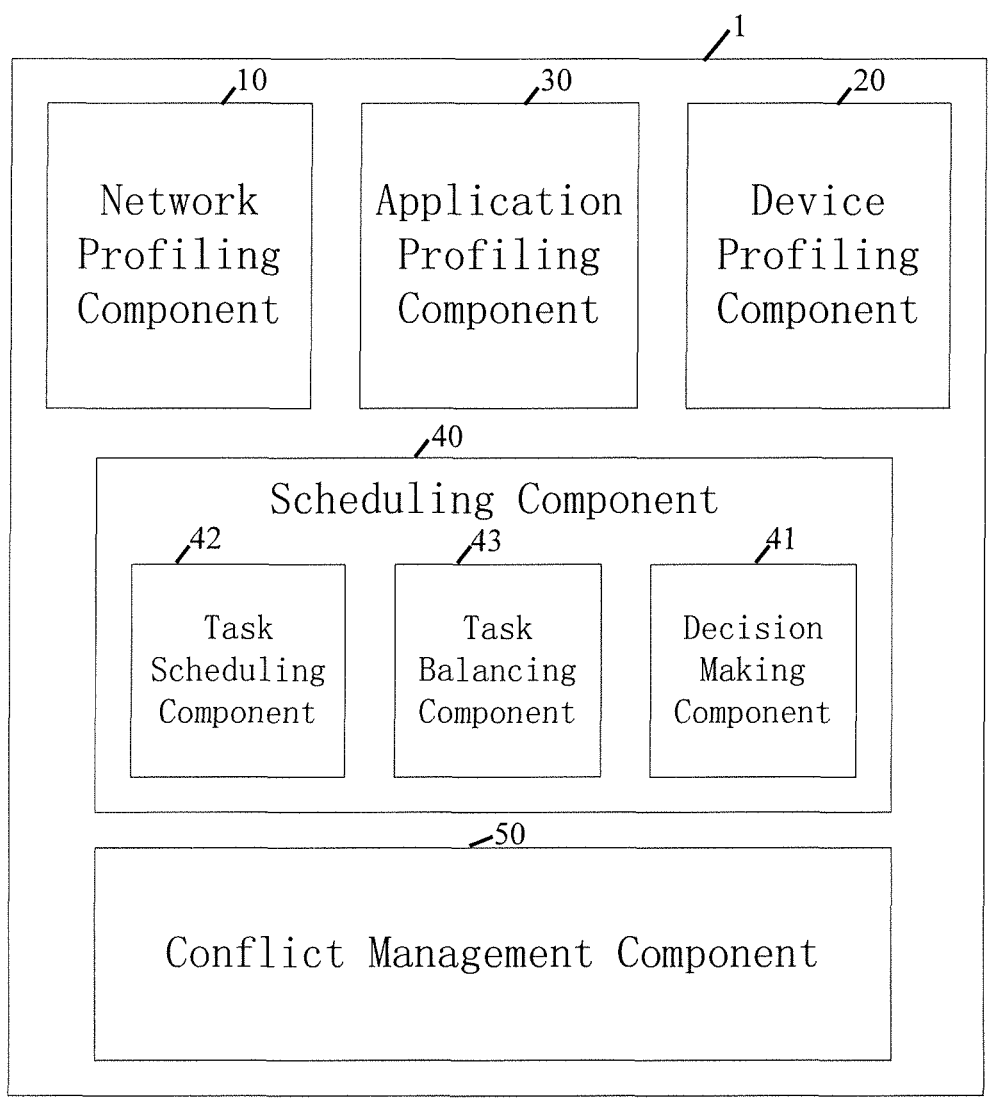
FIG. 1 illustrates one example structure of the whole system for Mobile Augmented Reality Scheduling.

In an embodiment, the present invention provides a system and method for task scheduling. In particular, the present invention provides a task scheduling system and method for MAR.

In one aspect of the present invention, a system for scheduling mobile augmented reality tasks performed on at least one mobile device and a workspace is provided, said mobile device comprising a CPU and a GPU and further comprising a Network Profiling Component configured to gather network related context data; a Device Profiling Component configured to gather hardware related context data; an Application Profiling Component configured to gather application related context data; and a Scheduling Component configured to receive the network related context data, the hardware related context data, and the application related context data and to schedule tasks between the CPU, the GPU and the workspace.

Furthermore, the network related context data can comprise network type and bandwidth.

The application related context data might include hardware requirements, urgency and historical execution times on CPU and GPU.

The device related context data can comprise current hardware and capability.

Preferably, the context data are acquired in runtime. The system collects context data when it is executing in addition or instead of gathering it in advance. Thus, the context data are acquired during the time during when the program is running.

More preferably, the Scheduling Component further comprises a Decision Making Component that chooses the optimal resource according to gathered context data; a Task Scheduling Component that executes the scheduling decision by said Decision Making Component; and optionally a Task Balancing Component responsible for balancing the workload of GPU and CPU.

The system for scheduling mobile augmented reality tasks further comprises a Conflict Management Component that monitors GPU in runtime and detects conflicts.

According to another aspect of the present invention, a method is provided for scheduling mobile augmented reality tasks performed on at least one mobile device and a workspace, said mobile device comprising a CPU and a GPU and further comprising the steps of: gathering network related context data; gathering hardware related context data; gathering application related context data; and receiving the network related context data, the hardware related context data, and the application related context data and scheduling tasks between the CPU, the GPU and the workspace.

In one exemplary embodiment, the method for scheduling mobile augmented reality tasks performed on at least one mobile device and a workspace, said mobile device comprising a CPU and a GPU and further comprising the steps of: splitting tasks between both the mobile device and the workspace according to the network related context data, the hardware related context data, and the application related context data, preferably based on calculated time delays; co-scheduling the tasks between CPU and GPU of the mobile device, preferably to maximize their overall performance.

Preferably, co-scheduling CPU and GPU further comprises the steps of selecting a historical data-based method used if execution time records are available and a processor model-based method that schedules tasks to their optimal processor according to processor execution model when time records are unavailable.

Furthermore, the historical data-based method can further comprise the steps of: scheduling tasks to their minimal execution time processor; and balancing tasks when one of the processor is idle by picking the lowest performance per cost task in the queue of the busy processor and transferring it to the other one.

The processor model-based method can further comprise the steps of: static compiling of tasks which classifies tasks into parallel, possible-parallel and sequential ones and generating codes for the specific processor; and scheduling possible-parallel to GPU and scheduling sequential tasks to CPU; and balancing CPU and GPU workload by scheduling compiling time of detected parallel tasks based on sampling.

Preferably, the processor model-based method further comprises the steps of detecting task conflicts by detecting read-write record of each GPU thread and re-scheduling tasks into CPU if it turns out to be a sequential task.

Computation outsourcing is an efficient way to largely reduce computational load off the mobile CPU. The component-based implementation brings good modularity, where AR users share common components and collaborative AR applications can be easily achieved. The components can also be configured at runtime which results in performance increase through offloading. Here, the middleware is used as a workspace between mobile devices and Cloud. As workspace is very close to mobile clients, it can be used as information-cache for mobile devices and rendering can also be done in workspace. In this way, computationally intense tasks are offloaded to workspace and short execution time is achieved.

Dynamic partition approach is also advanced to improve the performance of MAR. Task partition is conducted at runtime according to workload, network, etc. Cyber forging-based methods that divide original problems into subtasks and offload them to near devices help further to improve MAR.

CPU-GPU co-scheduling methods such as workload balancing are also put forward to improve the performance of Cloud and desktops. CPU, GPU and Cloud co-scheduling system and method according to the present invention takes advantage of each of them for the purpose of improving MAR performance.

In other words, an effective task allocation system and method to improve real-time property of MAR is provided. This is done through reasonably splitting tasks into CPU, GPU and Cloud to take advantage of each of them to achieve time delay minimization. Mobile Device, Application, Network context profiler are used to gather context data in run time as the mobile environment varies quickly. A Scheduling Component is responsible for tasks splitting between the three resources according to context data as well as monitoring GPU performance and balancing workload of GPU and CPU in run time. Real-time GPU monitoring is conducted by a conflict management component thereof.

The foregoing and other features, aspects and advantages of the present invention will become more apparent from the following detailed description of the present invention when taken in conjunction with the accompanying drawings.

Some preferred embodiments are now described with reference to the drawings. For explanation purpose, various specific details are set forth, without departing from the scope of the present invention as claimed.

The term 'component' is used herein refer to a software or hardware entity or a combination of software and hardware. It can be but is not limited to a process running in software environment in a processor or a specific hardware designed for a unique purpose or a whole entity including a programmable hardware as well as software burned in it. 'Method' mentioned whereby is intended to refer to the co-work algorithm of system components as well as each component's own work algorithm.

FIG. 1 is an example for the structure of a system 1 that reasonably schedules tasks into local GPU and CPU as well as Cloud to improve the real time property of Mobile Augmented Reality. The system 1 can monitor context changes such as network, device and application condition and split tasks into the three resources based on current context. It also detects conflicts in run time and balances workload of GPU and CPU.

With reference to FIG. 1, the system 1 comprises of a network profiling component 10, a device profiling component 20, an application profiling component 30, a scheduling component 40 and preferably a conflict management component 50. The first three components are used to acquire and collect context data related to mobile network condition, application information and the local device's current load. Context data collecting process can be conducted through but not limited to software mechanisms such as Android intents. The scheduling component 40 comprises a decision making component 41, a task scheduling component 42 and a task balancing component 43. The scheduling component 40 splits tasks into CPU, GPU and Cloud and balances their workload. Here, the task scheduling component 42 executes scheduling work and reschedules tasks into another resource if necessary. The task balancing component 43 balances GPU and CPU's workload in run time. The decision making component 41 figures out the optimal resource to be used under a certain circumstance. In addition, a conflict management component 50 is responsible for detecting improperly scheduled tasks for the GPU.

In other words, the scheduling component 40 makes scheduling decisions, executes task scheduling work and balances CPU/GPU workload preferably in runtime. The conflict management component 50 is responsible for profiling GPU preferably in runtime. Thus, the latter detects conflicts on GPU, i.e. collecting data regarding GPU usage.

Figure 2:
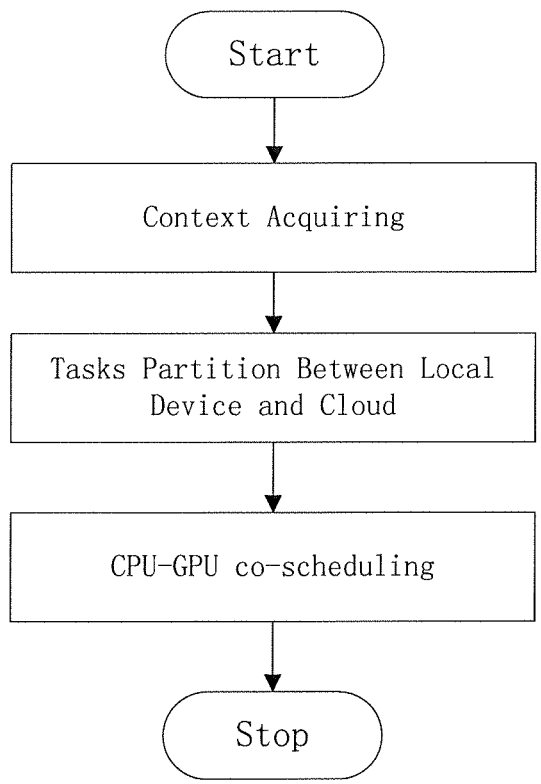
FIG. 2 illustrates a flow diagram of one embodiment of a method for Mobile Augmented Reality Scheduling.

FIG. 2 demonstrates a typical work flow of this approach. First, context data are acquired and collected by the three profiling components. In a second step, the system partitions tasks between mobile device and Cloud. In a third step, co-scheduling between CPU and GPU on the mobile device is conducted. This chart of work begins when a new task originates. Context gathering specified in this chart (FIG. 2) is overall and collective. Preferably, this step is a major step of collecting context data. i.e. a centralized part of context collecting. In addition some partial context collecting is also conducted at the last two steps according to specific need. Thus, the following steps may also collect a small amount of context data.

Figure 3:
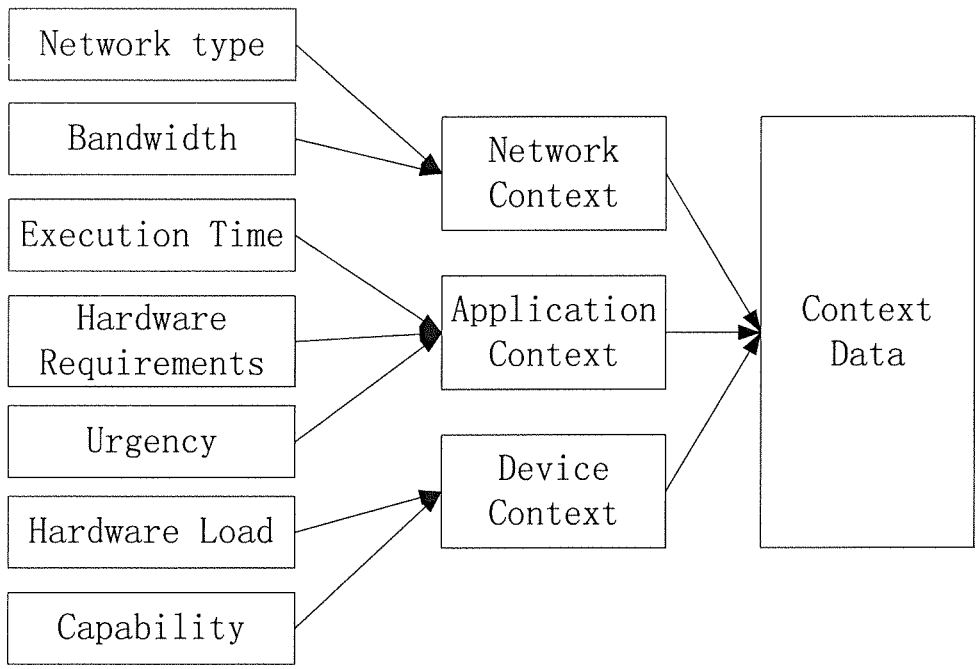
FIG. 3 illustrates an example of context data in accordance with aspects of the present invention.

FIG. 3 illustrates the specific context used in this approach. Network context can comprise network types such as 3G, Wifi, Wimax, Bluetooth and so on as well as bandwidth and location information generated by GPS and accelerator.

Application context can comprise previous execution time on GPU and CPU if there is one available, hardware requirements can be such as local screen and its urgency. Urgency is thereby quantified as integers. Applications' urgencies can be first evaluated manually in advance offline. Tasks decomposed from one application are assigned with the application's urgency in run time.

Device context can comprise hardware capabilities such as CPU and GPU frequency as well as its load. Idle state of each processor, e.g. GPU and CPU, can preferably be monitored.

Context collecting can be done by software. For example, Android SDK provides an adequate software interface to access these parameters in run time. Developers may register listeners to keep track of network environment parameters, e.g. data rate and availability of 3G, Bluetooth as well as Wifi. They may also use Android intents to monitor the device such as GPU, CPU workload as well as battery usage. Network bandwidth may be measured through Round-Trip Time (RTT) calculating. Application profiling can be conducted through source code analysis. For example, in Android systems, hardware requirements and urgency is figured out by detecting Android system method and pre-defined urgency number attached to source code.

Figure 4:
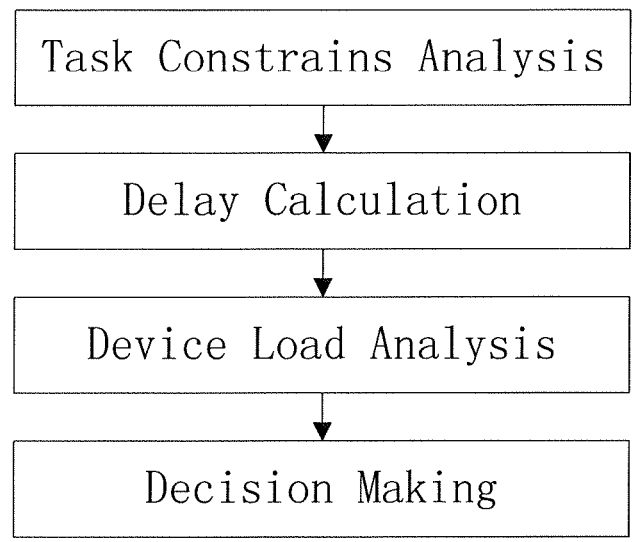
FIG. 4 illustrates an example of a flow chart of procedures which partitions tasks between local device and Cloud.

FIG. 4 illustrates the process of task partitioning between local device and Cloud. Application profiling component 30 first finds applications which are dependent on specific hardware of the mobile device and these tasks are therefore not allowed to be offloaded to the Cloud. This context data detecting is conducted through source code analysis. For example, in an Android device, if any method of within a task invokes the Android system Application Programming Interfaces (APIs) to access Bluetooth, USB, Screen and so on, the task will be regarded as local device-dependent. Application profiling component 30 also figures out software constraints for task offloading.

Software constraints are classified into two cases: migration mechanism requirements and inconsistent states between local device and remote Cloud image. How to handle the first case largely depends on the specific migration mechanism. For example, in Java serialization APIs only serializable methods can be allowed to be migrated. These methods include directly serializable ones as well as the ones which can be converted to be serializable within minor modifications. Tasks that fall under the second case are normally forbidden to be offloaded unless automatic synchronization between local and remote machine is presented.

Cloud forbidden array which contains one bit as an element is maintained for each task. If a task is found to dependent on the local device and cannot be offloaded, its corresponding bit is set. Priorities are assigned to them as tasks with higher urgency requirement are usually first to be scheduled.

Network profiler analyses the wireless environment to calculate the whole delay of transmission for task offloading. Device profiler figures out the currently available storage and CPU/GPU usage rate. The partition making method can be but not limited to Bayesian Decision or Decision Tree or Performance History Algorithm or any combination of them. For example, Bayesian model and Performance History Algorithm can be combined to make the decision whether to offload task to Cloud. If the current situation matches a past one, decision can be made according to historical data. Otherwise, Bayesian decision model can be adopted to do the job.

Figure 5:
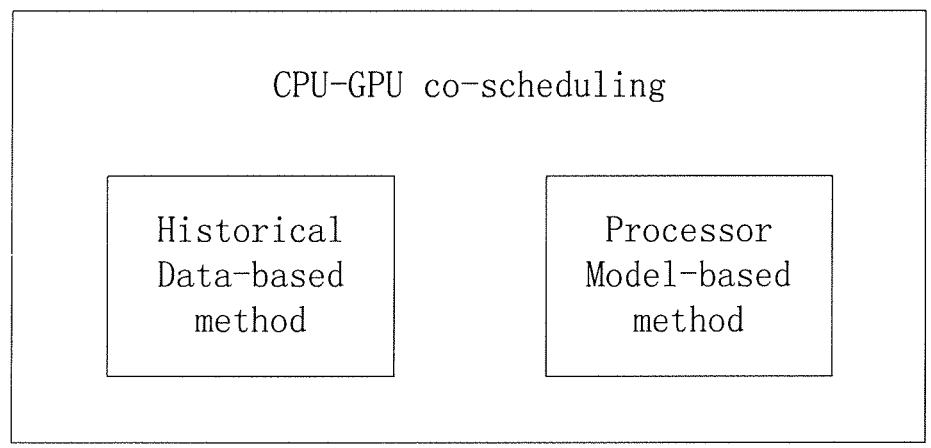
FIG. 5 illustrates an example of a GPU-CPU co-scheduling scheme.

FIG. 5 illustrates CPU-GPU co-scheduling method. This preferred embodiment combines historical data-based and processor model-based methods which work under different circumstances. The historical data-based method comes into play when previous execution times of tasks are available, whereas the processor model-based method works in cases where previous execution times of tasks are unavailable. Both methods have their own CPU and GPU task queues. Any of the processors pick a task with higher urgency from their queues' head once at a time. Historical execution time record for each process hereby can but not limited to be attached to them as well as stored in a database. GPU programming hereby can be made through but not limited to CUDA or OpenCL.

Figure 6:
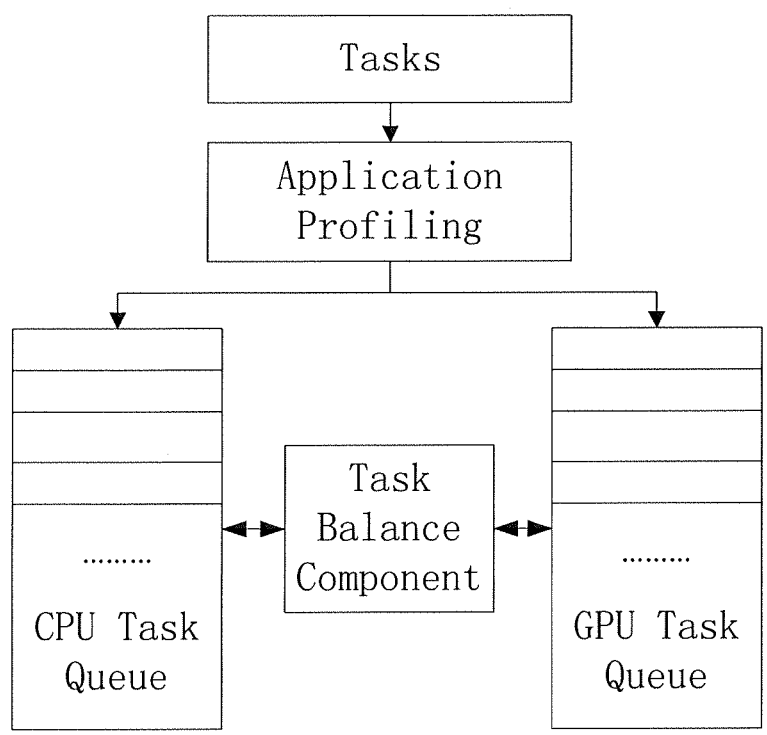
FIG. 6 illustrates an example of a flow chart of the procedure of the historical data-based method for GPU-CPU co-scheduling.

FIG. 6 illustrates the historical data-based method. In this preferred embodiment, both GPU and CPU have their own task queue. In this approach, tasks are scheduled to the optimal processor which has a shorter execution time record. Tasks in GPU/CPU queue are sorted in an urgency-decreased order. Task balancing component 43 in the system picks one task in one queue when the other processor is idle. The state of each processor is monitored by the device profiling component 20 of the system. The picking algorithm is based on a value function which can be but not limited to performance per cost. In this example, task balancing component 43 calculates performance per cost of each task in the queue and chooses the highest one. The performance can be defined as but not limited to the product of urgency and execution time on the current processor. The cost whereby, e.g. opportunity costs can be defined as but not limited to the product of expectation of urgency and execution time on the other processor.

Figure 7:
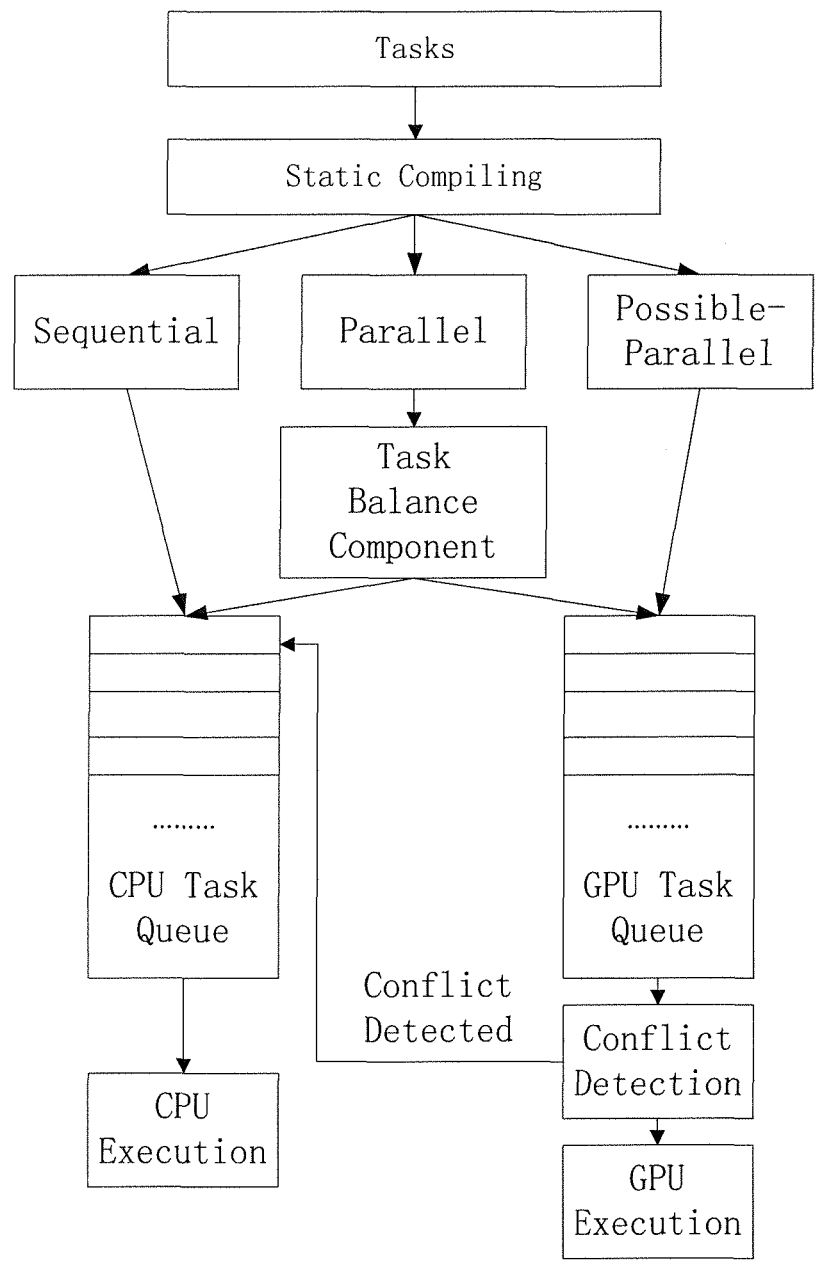
FIG. 7 illustrates an example of a flow chart of the procedure of the processor model-based method for GPU-CPU co-scheduling.

FIG. 7 illustrates the model-based method. This method models CPU as a sequential execution processor which does well in executing multi-branch and interdependent tasks. The method further models a GPU as a highly-paralleled processor, which contains multiple threads contained kernels and is good at running independent tasks. The method comprises a static compiling and a runtime conflict management. The static compiler first classifies tasks into three categories: sequential, possible-parallel, parallel. Parallel tasks include recursion invoked methods such as Quick Sort as well as normal loops, which execute independent instructions for each iteration. Some specific parallelizable tasks such as Computing All-Pairs Shortest Path in a directed graph are recognized manually. Possible-parallel tasks include irregular loops that access memory addresses via pointers. Sequential tasks refer to the ones which must be executed in order. This classification is conducted through compiling. Classifying by hand can also be used in cases where the automatic way doesn't work.

The first is scheduled to CPU queue and the second one is scheduled to GPU queue. CPU and GPU code is also generated in this phase. GPU kernels which contain a bunch of threads executing simultaneously are also invoked. Iteration of loop is assigned a thread and the whole loop is launched as a kernel. For nested loop, inner iteration is launched as a single thread if there is no instruction outside inner loop to take advantage of parallelism as far as possible. Otherwise, outer iteration is launched as a thread. As for threads and kernels generation for recursion, divide kernel and merge kernel are launched. Divide kernel unfolds original problem to lowest level and assigns each of them a single kernel. Merge kernel merges results of several subproblems into their parent problem and then reduces the number of threads until it is equal to that of leftover problems.

CPU parallel-computing is conducted through task parallel languages such as Task Parallel Library (TPL). The source code can be optimized by hand in advance. Runtime conflict management unit monitors GPU and if possible-parallel task is actually sequential, it will be rescheduled from GPU to CPU. The conflict detecting algorithm can be but not limited to maintaining a read and write log array which records thread access history of GPU memory. If one thread reads data from the memory unit that others write or multiple threads write to the same memory unit, conflict occurs as it depends on other threads and is proven to be not task-parallel. When any possible-parallel task is executed in GPU, CPU invokes a copy of it and transfers its variables in case the task turns out to be sequential. If the task is actually parallel, GPU will definitely accomplish it in advance and CPU copy will be abandoned.

Compiling time detected parallel tasks are scheduled to balance the workload of CPU and GPU. The GPU-CPU working rate detection and task splitting algorithm of the balancing can be but not limited to static sampling, model building and prediction as well as asymptotic sampling and co-scheduling (ASCS). The said working rate refers to numbers of tasks executed in a time unit. Whereby, static sampling samples a small portion of GPU and CPU tasks and calculates their execution rates respectively. Model building and prediction calculates CPU and GPU working rate based on execution model built for them in advance. ASCS keeps sampling procedure until they work stable. Sample size is doubled each time. Tasks splitting ratio will be based on their capability to keep them having equal execution time. New tasks are scheduled to the one with lighter workload if their current load is imbalanced while under balanced circumstance tasks are split in ratio of their working rates.

As the present invention may be embodied in several forms without departing from the scope or essential characteristics thereof, it should be understood that the above-described embodiments are not limited by any of the details of the foregoing descriptions, unless otherwise specified, but rather should be construed broadly within the scope as defined in the appended claims, and therefore all changes and modifications that fall within the present invention are therefore intended to be embraced by the appended claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for scheduling mobile augmented reality (MAR) tasks, the system comprising:
    a mobile device, comprising a central processing unit (CPU) and a graphics processing unit (GPU);
    a Network Profiling Component, configured to gather network related context data;
    a Device Profiling Component, configured to gather hardware related context data;
    an Application Profiling Component, configured to gather application related context data through source code analysis; and
    a Scheduling Component, configured to receive the network related context data, the hardware related context data, and the application related context data, and to schedule MAR tasks between the CPU, the GPU and a cloud-based workspace based on the network related context data, the hardware related context data, and the application related context data;
    wherein the Application Profiling Component is further configured to:
        find applications which are dependent on specific hardware of the mobile device, wherein dependent tasks are not allowed to be offloaded to the cloud-based workspace; and
        determine software constraints for task offloading, wherein the software constraints include constraints relating to migration mechanism requirements, wherein the constraints relating to migration mechanism requirements allow migration of directly serializable methods and do not allow, in the absence of automatic synchronization between the mobile device and the cloud-based workspace, migration of methods which are convertible to be serializable methods.

2. The system of claim 1, wherein the network related context data comprises network type and bandwidth.

3. The system of claim 1, wherein the application related context data comprises hardware requirements, urgency and historical execution time on the CPU and GPU.

4. The system of claim 1, wherein the device related context data comprises current hardware and capability.

5. The system of claim 1, wherein the context data is acquired in runtime.

6. The system of claim 1, wherein the Scheduling Component further comprises:

a Decision Making Component, configured to choose the optimal resource according to gathered context data; and a Task Scheduling Component, configured to execute a scheduling decision by the Decision Making Component.

7. The system of claim 6, further comprising:
a Task Balancing component, configured to balance workload of the CPU and the GPU.

8. The system of claim 1, wherein the system further comprises:
a Conflict Management Component, configured to monitor the GPU in runtime and detects conflicts.

9. The system according to claim 1, wherein the software constraints further include constraints relating to maintaining consistency between the mobile device and the cloud-based workspace, and wherein the constraints relating to maintaining consistency between the mobile device and the cloud-based workspace include forbidding tasks which may cause inconsistent states between the mobile device and the cloud-based workspace unless automatic synchronization between the mobile device and the cloud-based workspace is provided.

10. The system according to claim 1, wherein the system further comprises a cloud forbidden array, configured to maintain a bit corresponding to each task, wherein each bit indicates whether or not a respective task can be offloaded.

11. The system according to claim 1, wherein priorities are assigned to tasks such that tasks with relatively higher urgency requirements are scheduled with relatively higher priority.

12. A method for scheduling mobile augmented reality (MAR) tasks, the method comprising:
gathering, by a scheduling system, network related context data;
gathering, by the scheduling system, hardware related context data;
gathering, by the scheduling system, application related context data through source code analysis; and
scheduling, by the scheduling system, MAR tasks between a central processing unit (CPU) of a mobile device, a graphics processing unit (GPU) of the mobile device, and a cloud-based workspace based on the network related context data, the hardware related context data, and the application related context data;
wherein the method further comprises:
finding applications which are dependent on specific hardware of the mobile device, wherein dependent tasks are not allowed to be offloaded to the cloud-based workspace; and
determining software constraints for task offloading, wherein the software constraints include constraints relating to migration mechanism requirements, wherein the constraints relating to migration mechanism requirements allow migration of directly serializable methods and do not allow, in the absence of automatic synchronization between the mobile device and the cloud-based workspace, migration of methods which are convertible to be serializable methods.

13. The method of claim 12, further comprising:
splitting the MAR tasks between the mobile device and the cloud-based workspace according to the network related context data, the hardware related context data, and the application related context data; and
co-scheduling the MAR tasks between the CPU and the GPU of the mobile device.

14. The method of claim 13, wherein co-scheduling the MAR tasks between the CPU and the GPU of the mobile device further comprises:
selecting a historical data-based method if execution time records are available.

15. The method of claim 14, wherein the historical data-based method further comprises:
scheduling tasks to a respective processing unit corresponding to a minimal execution time; and
balancing tasks when one processing unit is idle by picking the lowest performance per cost task in the queue of a busy processing unit and transferring it to the idle processing unit.

16. The method of claim 13, wherein splitting the MAR tasks between the mobile device and the cloud-based workspace is further based on calculated time delays.

17. The method of claim 13, wherein co-scheduling the MAR tasks between the CPU and the GPU of the mobile device further comprises:
selecting a processor model-based method that schedules tasks to their optimal processor according to a processor execution model when time records are unavailable.

18. The method of claim 17, wherein the processor model-based method further comprises:
static compiling of tasks which classifies tasks into parallel, possible-parallel and sequential tasks and generating codes for a specific processor;
scheduling possible-parallel tasks to the GPU and scheduling sequential tasks to the CPU; and
balancing CPU and GPU workload by scheduling compiling time of detected parallel tasks based on sampling.

19. The method of claim 18, wherein the processor model-based method further comprises:
detecting task conflicts by detecting read-write records of each GPU thread; and
re-scheduling sequential tasks into the CPU.

* * * * *